United States Patent [19]

Wilhelmy

[11] Patent Number: 4,745,687

[45] Date of Patent: May 24, 1988

[54] LEVEL INDICATION DEVICE AND METHOD FOR PROVIDING A LEVEL INDICATION OF UP TO THREE DEGREES ACCURACY

[76] Inventor: Whitney Wilhelmy, 1442 Leisure World, Mesa, Ariz. 85206

[21] Appl. No.: 53,274

[22] Filed: May 22, 1987

[51] Int. Cl.$^4$ ............................................. G01C 9/36
[52] U.S. Cl. .................................... 33/348.2; 33/370; 33/377; 33/390
[58] Field of Search .............. 33/377, 379, 390, 348.2, 33/333, 334

[56] References Cited

U.S. PATENT DOCUMENTS

| | | | |
|---|---|---|---|
| 1,260,565 | 3/1918 | Marshall | 33/377 |
| 1,267,049 | 5/1918 | Boos | 33/377 |
| 1,274,333 | 7/1918 | Roland | 33/377 |
| 1,291,230 | 1/1919 | Stitzel . | |
| 1,820,791 | 8/1931 | Forrest | 33/390 X |
| 1,948,612 | 2/1934 | Bouchard | 33/390 X |
| 2,205,733 | 6/1940 | Sauter et al. | 33/348.2 |
| 2,605,553 | 8/1952 | Kunkel | 33/370 |
| 3,146,529 | 9/1964 | Chamberlin | 33/370 |
| 3,422,544 | 1/1969 | Wyse . | |
| 3,766,657 | 10/1973 | Hopkins | 33/348 |
| 3,916,531 | 11/1975 | Morton | 33/370 |
| 4,085,515 | 4/1978 | Darden . | |

Primary Examiner—William D. Martin, Jr.
Attorney, Agent, or Firm—Harry M. Weiss & Associates

[57] ABSTRACT

A level indicating device used to indicate proper orientation of a recreation vehicle (RV) such as a motor home, trailer, or camper. The device comprises of a generally transparent dome fixedly mounted on a base which can be removeably attached to a generally flat, horizontal surface which is preferably the ceiling of the RV. The dome is approximately half-filled with a liquid which is resistant to freezing, and carries a plurality of parallel lines graduated to indicate when the orientation of the base with respect to horizontal is within a three degree tolerance. In operation, the surface of the liquid lies generally between the plurality of parallel lines when the flat surface to which the base is attached is within three degrees of tolerance with respect to horizontal. The dome is illuminated by a conventional pen light removeably inserted into apertures in the base, the light being activated by pressing on one end of the light.

5 Claims, 1 Drawing Sheet

LEVEL INDICATION DEVICE AND METHOD FOR PROVIDING A LEVEL INDICATION OF UP TO THREE DEGREES ACCURACY

BACKGROUND OF THE INVENTION

The present invention relates generally to level indicating devices and, in particular, to a device used to indicate proper orientation of a recreation vehicle (RV).

Recreation vehicles are moveable living quarters, such as motor homes, trailers, and campers, which generally include small living areas, sleeping quarters, and kitchens. Most of these RVs are equiped with equipment, such as refrigerators, which must be approximately level to operate properly. These refrigerators generally have a tolerance of three degrees from horizontal level; approximately the maximum angle from horizontal which can provide the occupants with comfortable living quarters.

The problem of leveling equipment within a general range when the equipment is continually mobile arises frequently with refrigerators in RVs. Therefore, refrigrators in RVs are the focus of the subsequent discussion. However, it is recognized that in the border aspects of the invention, other types of equipment and vehicles might be involved.

The majority of parking areas for RVs are intended to be within the horizontal tolerance for refrigerators. When the parking pads are horizontal, there is no problem with respect to the refrigerator. However, since this is not always the situation, the driver of the vehicle must move the RV into a variety of positions on the parking pad until proper orientation is achieved, or, where the RV is so equiped, the wheels of the RV must be altered with respect to the vehicle's chassis to obtain the appropriate level orientation. Frequently the operator will be required to level the RV in the dark.

To conveniently and inexpensively allow the operator of an RV to level the wheels of the vehicle for proper refrigerator operation, a mechanism is required which can be easily read to the appropriate tolerance in the day or night and which can be mounted conveniently on the ceiling near the refrigerator itself. Although some mechanisms for leveling RVs have been invented, they do not incorporate easy to read liquid leveling devices readily marked for the tolerance required for proper refrigerator operation. Neither do these previous mechanisms include built in lights for reading the mechanism in the dark.

SUMMARY OF THE INVENTION

Accordingly, it is an object of the present invention to provide a device or mechanism which is preferably mounted on the ceiling and is used to level recreation vehicles such as motor homes, trailers, and campers to a level of tolerance of preferably about three degrees from horizontal level.

It is also an object of the present invention to provide a leveling mechanism which utilizes a liquid leveling device with conveniently marked tolerance lines for easy reading when leveling an RV.

It is further an object of the present invention to provide a leveling device which allows convenient lighting of the leveling mechanism for night time leveling through a built-in light source.

These and other objects, features, and advantages of the present invention, hereinafter disclosed, will become more apparent from the following, more detailed, description of the present invention with reference to the accompanying drawings.

DESCRIPTION OF THE PREFERRED EMBODIMENT

Figure 1:
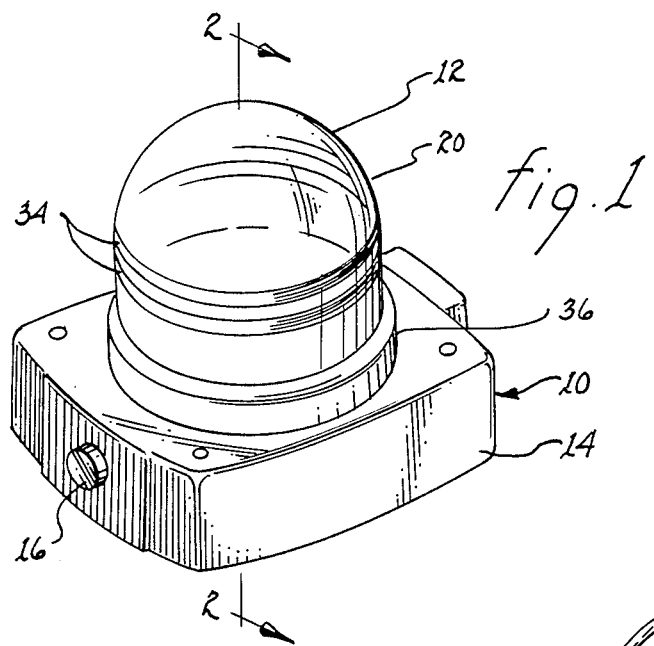
FIG. 1 is a top elevational view of a device embodying the present invention.

Referring to the accompanying drawings, and in particular with reference to FIG. 1, there is shown a leveling device or mechanism 10 which is preferably mounted on the ceiling and is used to level a recreation vehicle (RV), such as a motor home, trailer, or camper, to a tolerance of preferably about three degrees from horizontal level. The leveling mechanism 10 comprises a liquid level device 12 fixidly attached to a base 14, wherein a light 16 is removeably inserted. The bottom of the base 14 is connected to a ceiling portion of the RV, and if a long RV is being used, two or more leveling mechanisms 10 are employed.

Figure 2:
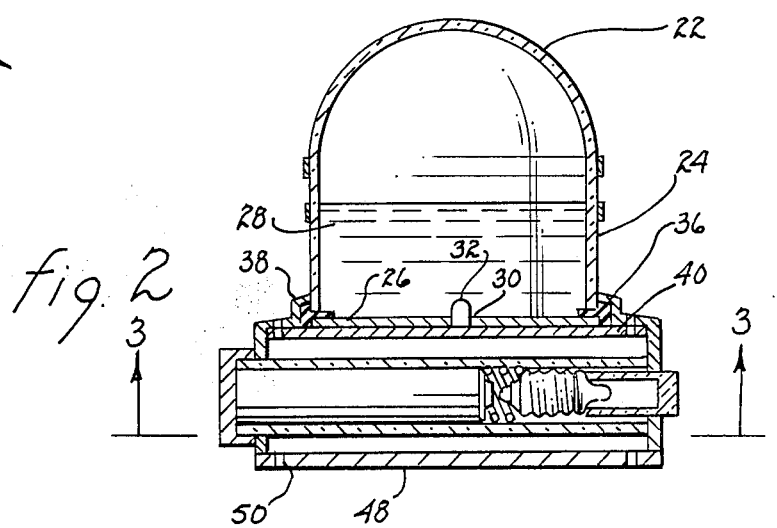
FIG. 2 is a side cut-away view of the present invention taken along line 2—2 of FIG. 1.

The liquid level device 12 comprises a transparent dome 20 constructed in the shape of a hollow hemisphere 22 (see FIG. 2) supported by a hollow cylinder 24, and fixedly sealed on the bottom to a circular ring 36. The circular ring 36 is fixedly sealed on the bottom to a generally flat disk 26. The cross-section of the circular ring 36 is constructed in a "T" configuration on its side with the hollow cylinder 24 and the disk 26 fixedly sealed to opposite sides of the "T" configuration's horizontal member and adjacent to the cross-member of the "T". The transparent dome 20 is approximately half-filled by a liquid 28. The preferred embodiment of the liquid 28 comprises part conventional anti-freeze and part water. Other liquids which are colored and resistant to freezing in low temperatures can also be used as the liquid 28. There is an aperture 30 in the disk 26 wherein the liquid 28 is inserted into the transparent dome 20. The aperture 30 is fixedly sealed after the liquid 28 is inserted into the transparent dome 20 by a plug 32. A plurality of dark lines 34 are located around the perimeter of the hollow cylinder 24 and are spaced apart such that the width of the surface of the liquid is generally within the plurality of dark lines 34 when the bottom of the leveling mechanism 10 is oriented within preferably about three degrees from horizontal level. The disk 26 is preferably constructed of transparent material to allow light from the source of light 16 to illuminate the liquid 28 in the dark.

The transparent dome 20 is fixedly mounted onto the base 14 by a restraining lip 38 and a support plate 40. The restraining lip 38 abuts the cross-member of the circular ring 36 to keep the transparent dome 20 from moving away from the base 14. The support base 40 abuts the cross-member of the circular ring 36 and the disk 26 to keep the transparent dome from moving further into the base.

Figure 3:
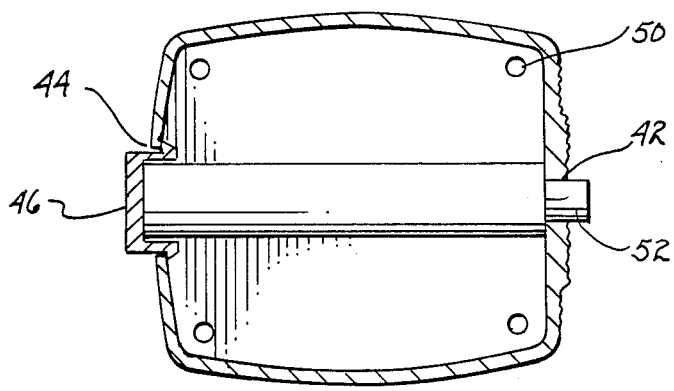
FIG. 3 is a bottom cut-away view of the present invention taken along line 3—3 of FIG. 2.

The base 14 is preferably constructed in a generally rectangular hollow box configuration. With regard to FIG. 3, a small aperture 42 and a larger aperture 44 are located in opposing ends of the base 14 to allow the light 16 to be removeably inserted into the base 14. The larger aperture 44 is removeably covered by a squeezelock cover 46 to removeably secure the light 16 into the base 14. A cover plate 48 removeably covers the bottom of the base 14. A plurality of support apertures 50 are located in the base 14, the support base 40, and the cover plate 48, and are aligned such that nails, screws, or other conventional securing devices may attach the level mechanism 10 to a generally flat, horizontal surface which is preferably the ceiling of the RV.

The light 16 is preferably a pen type light which is activated by pressing on the front of the light to engage the battery and illuminate the light. A small end 52 of the light 16 is removeably inserted through the small aperture 42 while the body of the light 16 abuts the inside wall of the base 14.

While the invention has been particularly shown and described in reference to the preferred embodiments thereof, it will be understood by those skilled in the art that changes in form and details may be made without departing from the spirit and scope of the invention.

I claim:

1. A level indicating device comprising:
   an elongated semi-spherical shaped enclosure having a transparent portion, said transparent portion fixedly mounted upon a base portion;
   light means for illuminating the interior of said enclosure; and
   level means for indicating when said base portion has a known selected orientation with respect to a horizontal plane, said level means comprises:
   a liquid constituting approximately one-half the volume of said enclosure located with said enclosure, said liquid comprising a means for retarding freezing; and
   a pair of spaced apart circumferential parallel lines carried on said transparent portion, said parallel lines being separated by a width, such that when the surface of said liquid is located between said pair of parallel lines then the bottom surface of said base portion is within three degrees from level with respect to the horizontal plane.

2. The level indicating device according to claim 1 wherein said light means comprises a pen light bulb, said pen light bulb having means for providing a source of light by pressing on one end of said light bulb to engage a battery to provide a source of electrical energy to turn on said light bulb.

3. The level indicating device according to claim 1 wherein said light means is removeably inserted into two apertures in opposing ends of said base portion, one of said two apertures is enclosed by a means for securing said light means into place, and a third aperture in the top of said base portion allows light from said light means to illuminate said enclosure.

4. The level indicating device according to claim 1, said enclosure comprising:
   a liquid constituting approximately one-half the volume of said enclosure located within said enclosure; and
   a means for sealing said liquid in said enclosure.

5. The level indicating device according to claim 4, said liquid comprising a freeze retardant substance such as anti-freeze.

* * * * *